US012340913B2

(12) United States Patent
Fukui et al.

(10) Patent No.: US 12,340,913 B2
(45) Date of Patent: Jun. 24, 2025

(54) ORGANIC IODINE REMOVER

(71) Applicant: HITACHI-GE NUCLEAR ENERGY, LTD., Ibaraki (JP)

(72) Inventors: Sohei Fukui, Tokyo (JP); Motoi Tanaka, Ibaraki (JP); Masaaki Tanaka, Ibaraki (JP); Fumio Totsuka, Ibaraki (JP); Tomoharu Hashimoto, Ibaraki (JP); Kazuo Tominaga, Ibaraki (JP)

(73) Assignee: HITACHI-GE NUCLEAR ENERGY, LTD., Ibaraki (JP)

( * ) Notice: Subject to any disclaimer, the term of this patent is extended or adjusted under 35 U.S.C. 154(b) by 867 days.

(21) Appl. No.: 17/433,271

(22) PCT Filed: Jan. 21, 2020

(86) PCT No.: PCT/JP2020/001914
§ 371 (c)(1),
(2) Date: Aug. 24, 2021

(87) PCT Pub. No.: WO2020/174938
PCT Pub. Date: Sep. 3, 2020

(65) Prior Publication Data
US 2022/0139586 A1 May 5, 2022

(30) Foreign Application Priority Data
Feb. 25, 2019 (JP) .................. 2019-032046

(51) Int. Cl.
*G21F 9/02* (2006.01)
*B01D 53/02* (2006.01)
*B01D 53/70* (2006.01)
*G21C 13/02* (2006.01)

(52) U.S. Cl.
CPC .............. *G21F 9/02* (2013.01); *B01D 53/02* (2013.01); *B01D 53/70* (2013.01); *G21C 13/02* (2013.01)

(58) Field of Classification Search
CPC ........... G21F 9/02; B01D 53/02; B01D 53/70; G21C 13/02
USPC ......................................................... 588/2
See application file for complete search history.

(56) References Cited

U.S. PATENT DOCUMENTS

| | | | | |
|---|---|---|---|---|
| 9,799,418 | B2* | 10/2017 | Kani ................. | G21F 9/06 |
| 2016/0208311 | A1 | 7/2016 | Ota et al. | |
| 2016/0260507 | A1 | 9/2016 | Lee et al. | |

FOREIGN PATENT DOCUMENTS

| | | | | |
|---|---|---|---|---|
| JP | 63-12345 A | 1/1988 | | |
| JP | 07-209488 A | 8/1995 | | |
| JP | 2002-350588 A | 12/2002 | | |
| JP | 2015-126735 A | 7/2015 | | |
| JP | 2015-140261 A | 8/2015 | | |
| JP | 2015-522161 A | 8/2015 | | |
| JP | 2016206164 A | * 12/2016 | ............ | Y02E 30/30 |
| JP | 2017-223535 A | 12/2017 | | |
| WO | 2014/007977 A1 | 1/2014 | | |

OTHER PUBLICATIONS

Extended European Search Report received in corresponding European Application No. 20762673.0 dated Sep. 27, 2022.
International Search Report PCT/JP2020/001914 dated Apr. 21, 2020.
Japanese Office Action received in corresponding Japanese Application No. 2019-32046 dated Jan. 10, 2023.

* cited by examiner

*Primary Examiner* — Edward M Johnson
(74) *Attorney, Agent, or Firm* — MATTINGLY & MALUR, PC

(57) ABSTRACT

As an organic iodine remover that removes organic iodine in a containment vessel of a nuclear reactor, an organic agent (for example, an ionic liquid, an interfacial active agent, a quaternary salt, or a phase transfer catalyst) having a function of dissolving and decomposing the organic iodine and retaining iodine is used. The organic iodine remover is a substance composed of a cation and an anion. The organic iodine remover is, in particular, an organic iodine remover in which, in a structure of the cation of the organic agent, carbon or oxygen is bonded to, via a single bond, to a phosphorus element, a sulfur element or a nitrogen element, the number of carbon chains is 2 or more, and an anionic structure is configured with a substance with high nucleophilicity. By using such an organic agent, the organic iodine is removed with an efficiency of 99% or more.

18 Claims, 3 Drawing Sheets

[FIG. 1]
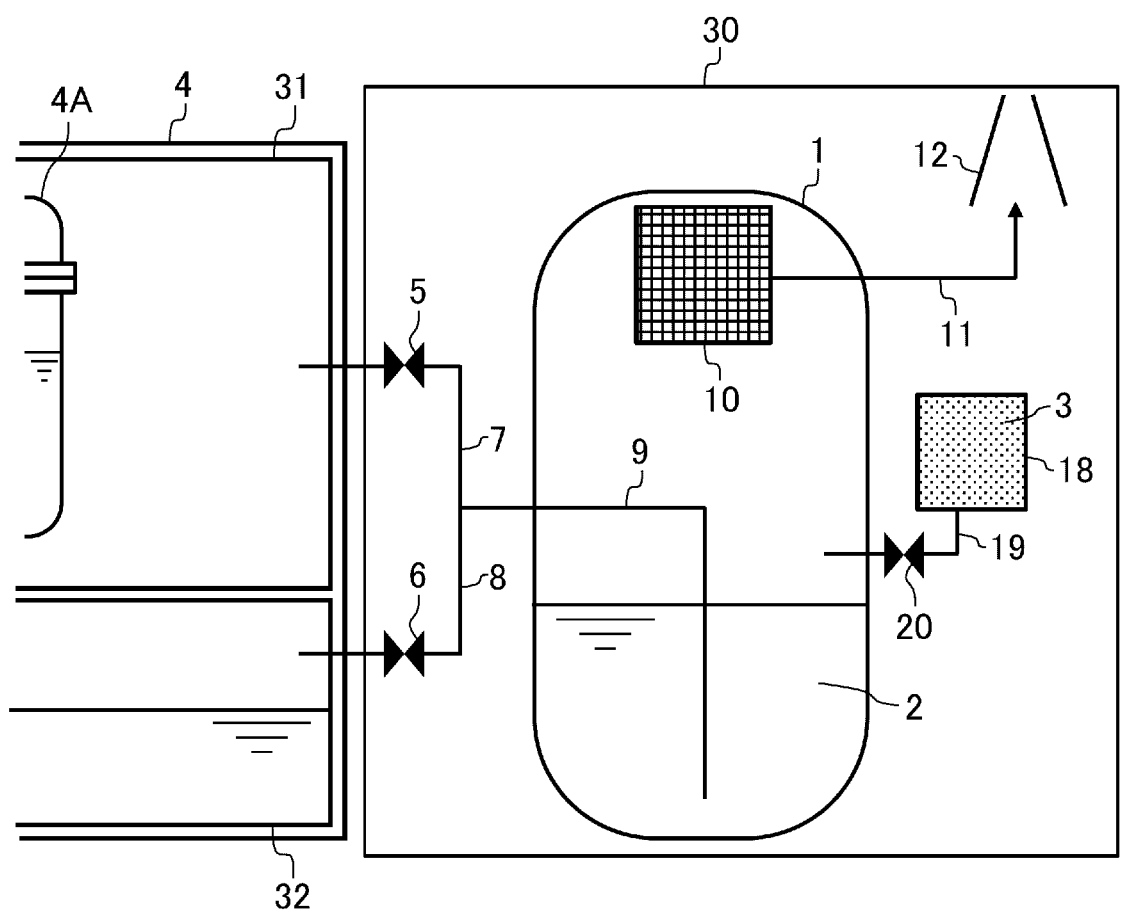

[FIG. 2]
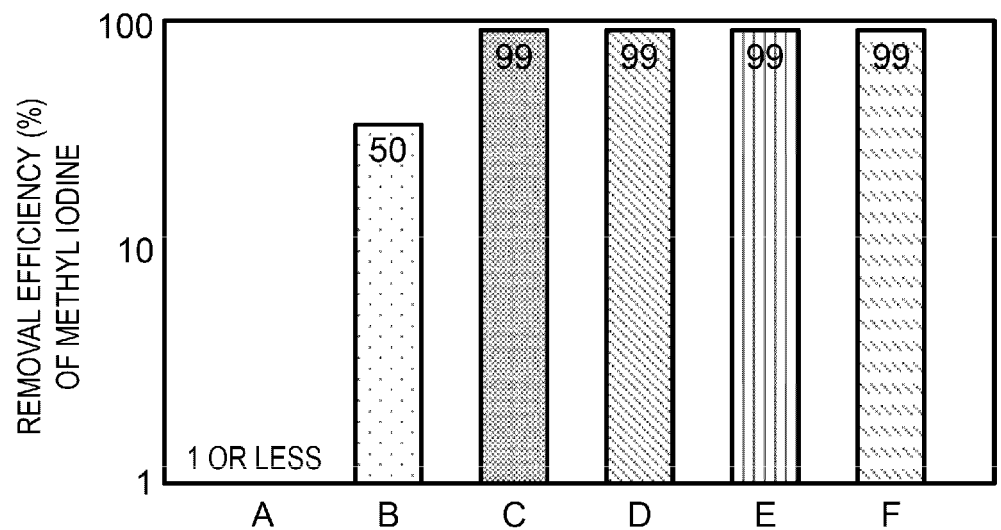

[FIG. 3]
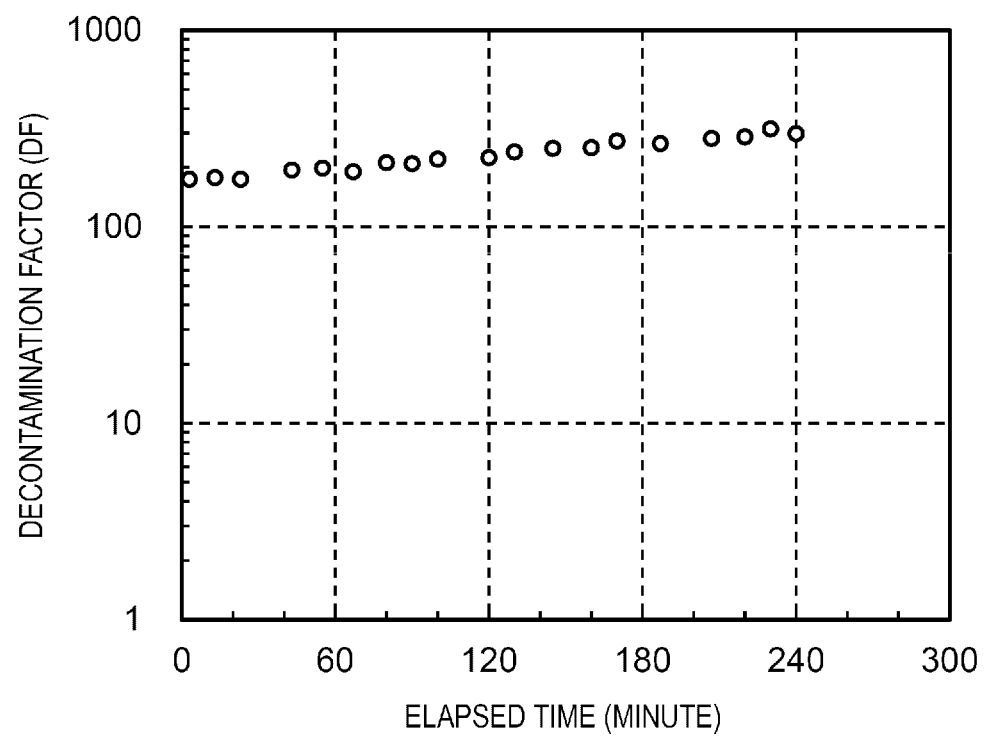

ORGANIC IODINE REMOVER

TECHNICAL FIELD

The present invention relates to an organic iodine remover that removes organic iodine contained in a gas such as steam, including radioactive organic iodine released from a nuclear reactor.

BACKGROUND ART

At a nuclear reactor, a filtered containment venting apparatus is installed to prevent radioactive substances released from the nuclear reactor from leaking into the environment. When a pressure in a containment vessel is abnormally increased as a reactor core is damaged due to an accident in the nuclear reactor, the containment vessel is damaged and a large-scale leakage occurs, so that a steam inside the containment vessel is vented in advance to prevent an overpressure damage of the containment vessel. When high-temperature and high-pressure steam is released from the nuclear reactor into the containment vessel, the steam is passed through the filtered containment venting apparatus to remove major radioactive substances before the steam is released into the atmosphere.

The radioactive substances generated during the accident of the nuclear reactor include noble gases, aerosols, inorganic iodine, organic iodine, or the like. In the filtered containment venting apparatus, these radioactive substances excluding the noble gases are trapped in a vessel, and are prevented from being released to the environment. Generally, as described in PTL 1, the filtered containment venting apparatus retains scrubbing water that acts as a wet filtered containment in the vessel, and further incorporates a metal filter that is a dry filter.

The scrubbing water is an aqueous solution in which sodium thiosulfate, sodium hydroxide, or the like is dissolved, and the vented steam is released into the scrubbing water. By a reaction with sodium thiosulfate, ionized inorganic iodine (elemental iodine) or the aerosol is removed by being dissolved and collected in the scrubbing water. Some of the aerosol that is released in a gas phase through the scrubbing water is removed by adhering to and colliding with the metal filter. On the other hand, the organic iodine that is difficult to be removed by the above mechanism is removed by the dry filter such as silver zeolite or activated carbon as described in PTL 2.

CITATION LIST

Patent Literature

PTL 1: JP-A-2015-522161
PTL 2: JP-A-H07-209488

SUMMARY OF INVENTION

Technical Problem

The organic iodine, including methyl iodine, released from the nuclear reactor is poorly soluble in water and even if the organic iodine is introduced into pool water or the scrubbing water in a pressure prevention chamber during venting, the organic iodine is not sufficiently removed. In addition, the organic iodine such as methyl iodine may be generated by the reaction of the elemental iodine in an exhaust process from the nuclear reactor. For these reasons, there is a demand for an organic iodine remover capable of efficiently removing the organic iodine.

As the organic iodine remover, silver zeolite or activated carbon is known (see PTL 2). However, since these organic iodine removers have reduced removal efficiency when water adheres thereto, a mechanism for removing moisture is required when the influence of the moisture is a concern. Therefore, a structure of the filtered containment venting apparatus is complicated. In addition, since a large amount of these organic iodine removers are required, a special apparatus design or a complicated apparatus structure is required as disclosed in PTL 2.

Therefore, an object of the invention is to provide an organic iodine remover that does not require a complicated structure, is not influenced by moisture, and has a function of efficiently removing organic iodine in a containment vessel of a nuclear reactor.

Solution to Problem

An organic iodine remover according to the invention for solving the above problems removes organic iodine in a containment vessel of a nuclear reactor, the organic iodine remover is a substance composed of a cation and an anion, and is substance in which, in a structure of the cation, carbon or oxygen is bonded, via a single bond, to a phosphorus element, a sulfur element or a nitrogen element, and a structure of the anion has an anion charge present in a carbon element, a sulfur element, a nitrogen element, an oxygen element or a halogen element.

Advantageous Effect

The invention can provide an organic iodine remover that has a function of efficiently removing organic iodine in a containment vessel of a nuclear reactor.

BRIEF DESCRIPTION OF DRAWINGS

FIG. 1 is a schematic view of a filtered containment venting apparatus according to the invention.

FIG. 2 shows removal efficiency of an organic iodine remover and a chemical structure of the organic iodine remover according to the invention.

FIG. 3 shows a change over time in a decontamination factor of the organic iodine remover according to the invention.

DESCRIPTION OF EMBODIMENTS

Hereinafter, a form (referred to as "present embodiment") for carrying out the invention will be described with reference to the drawings. In the description, the same elements are denoted by the same reference numerals, and repetitive descriptions thereof will be omitted.

<Filtered Containment Venting Apparatus>

FIG. 1 is a schematic view showing a configuration of a filtered containment venting apparatus 30 in the present embodiment.

As shown in FIG. 1, a containment vessel 4 includes a nuclear reactor pressure vessel 4A, a dry well 31, and a wet well 32.

The filtered containment venting apparatus 30 removes radioactive substances contained in a gas as much as possible when the gas in the containment vessel 4 is released to the atmosphere in order to reduce a pressure in the containment vessel 4 in which the dry well 31 and the wet well 32 are included, during a severe accident such as damage of the nuclear reactor pressure vessel 4A.

As shown in FIG. 1, the filtered containment venting apparatus 30 in the present embodiment includes a filtered containment venting vessel 1 storing scrubbing water 2 and a metal filter 10 for a radioactive remover inside the filtered containment venting vessel 1, a dry well venting pipe 7 and a wet well venting pipe 8 connected to the containment vessel 4, an inlet pipe 9 having one end connected to the dry well venting pipe 7 and the wet well venting pipe 8 and having multiple ends introduced into the scrubbing water 2 in the filtered containment venting vessel 1, and an outlet pipe 11 connected to the metal filter 10 in the filtered containment venting vessel 1.

The filtered containment venting vessel 1 has a role of being used for collecting aerosols, inorganic iodine, and organic iodine, which are radioactive substances.

In addition, the filtered containment venting apparatus 30 includes a storage container 18, in which an organic iodine remover 3 is stored, outside the filtered containment venting vessel 1. The storage container 18 is connected to the filtered containment venting vessel 1 via an injection pipe 19, and a valve 20 is provided in the injection pipe 19. In a normal state, the storage container 18 retains the organic iodine remover 3, and individually stores the scrubbing water 2 and the organic iodine remover 3.

Accordingly, by simply providing an organic agent (described later) having a function of removing the organic iodine as the organic iodine remover 3 in the filtered containment venting apparatus 30, the radioactive substances released from the containment vessel 4, particularly the organic iodine, can be efficiently removed during an accident.

The filtered containment venting apparatus 30 removes the radioactive substances contained in the gas as much as possible when the gas in the containment vessel 4 is released to the atmosphere in order to reduce the pressure in the containment vessel 4 in which the dry well 31 and the wet well 32 are included, during a severe accident such as damage of the nuclear reactor pressure vessel 4A.

The gas (fluid) containing the organic iodine may be passed through the organic iodine remover 3, and a providing position of the organic iodine remover 3 or the storage container 18 may be in the filtered containment venting vessel 1, or the organic iodine remover 3 or the storage container 18 may be provided separately upstream or downstream outside the filtered containment venting vessel 1.

Since a relatively high temperature gas flows into the filtered containment venting vessel 1 during the accident, it is presumed that the organic iodine is gaseous. In order to remove the gaseous organic iodine, diffusion electrophoresis, thermophoresis, brown diffusion, and convection of the organic iodine in air bubbles are used, the organic iodine remover 3 is brought into contact with the air bubbles and dissolved in the air bubbles, so that it is desirable to provide the organic iodine remover 3 so as to increase a residence time of the air bubbles in the liquid.

Next, an operating principle of the filtered containment venting apparatus 30 of the present embodiment will be described.

When isolation valves 5 and 6 are opened, the radioactive substances released into the containment vessel 4 during the accident flows into the dry well venting pipe 7 or the wet well venting pipe 8 connected to the containment vessel 4. Before opening the isolation valves 5 and 6, the valve 20 is opened and the organic iodine remover 3 stored in the storage container 18 is injected into the filtered containment venting vessel 1. An injection method is not limited to a method in which an injection is performed under a water head pressure or a method in which the injection is performed under a nitrogen pressure.

Thereafter, the radioactive substances flow into the scrubbing water 2 and the organic iodine remover 3 in the filtered containment venting vessel 1 via the inlet pipe 9, and the organic iodine in the radioactive substances is removed by the organic iodine remover 3.

The gas from which the organic iodine is sufficiently removed passes through the outlet pipe 11 and is released to the outside by an exhaust pipe 12.

Therefore, according to the filtered containment venting apparatus 30 of the present embodiment, it is possible to efficiently remove the organic iodine with a simple design, and to prevent a processing cost from becoming high without complicating a removal system for the organic iodine as in the technique described in PTL 2. Further, since it is not necessary to introduce a large-scale apparatus, there is an advantage that a static system of the filtered containment venting apparatus 30 can be maintained even when the apparatus is applied to the existing filtered containment venting apparatus 30.

Depending on an individual plant output or an accident scenario, among the radioactive substances generated during the accident, it is evaluated that about 1 kg of the organic iodine is generated and it is evaluated that methyl iodine is mainly generated as the organic iodine during a severe accident involving fuel damage such as damage of the nuclear reactor pressure vessel.

Therefore, in the present embodiment, a substance (organic agent) composed of only a cation and an anion is used as the organic iodine remover 3.

<Organic Iodine Remover>

During the accident of the nuclear reactor, it is assumed that the steam is vented at a high temperature of about 100° C. to 160° C. Therefore, the organic agent used as the organic iodine remover 3 preferably does not volatilize substantially at a temperature lower than about 160° C., and more preferably does not volatilize at a temperature lower than 200° C. Since it is sufficient that the organic agent is a liquid at a temperature during the operation of filtered containment venting, the organic agent may be a liquid or a solid at a room temperature.

Further, as long as the organic agent is a non-volatile liquid, it is possible to prevent the liquid itself from volatilizing even when a high-temperature and high-pressure gas is introduced during venting.

Therefore, in the present embodiment, a substance composed of only a cation and an anion is used as the organic agent having non-volatility and having a property of removing the organic iodine. Examples of the substance composed only of a cation and an anion include those called, for example, an ionic liquid, an interfacial active agent, a quaternary salt, and a phase transfer catalyst. As the organic agent used in the present embodiment, an ionic liquid, an interfacial active agent, a quaternary salt, a phase transfer catalyst, and a mixture thereof can be used.

The organic agent used in the present embodiment may have a dissociated structure of two or more molecules in which the cation and the anion the cation and the anion are not chemically bonded to each other, or may be structure composed of one molecule in which the cation and the anion are not dissociated by a chemical bond.

By using the organic agent having such a configuration as the organic iodine remover 3, it is possible to remove the organic iodine with an efficiency of 99% or more.

The organic agent exhibiting these effects is an organic agent ($X^+$-$Y^-$) composed of a combination of only a cation ($X^+$) and an anion ($Y^-$), and as shown above, high organic iodine removal performance is achieved by three steps of "dissolution of the organic iodine", "decomposition of the organic iodine", and "retention of an organic iodine decomposition product".

In the organic iodine remover 3 of the present embodiment, the dissolution of the organic iodine is mainly controlled by the cation ($X^+$) of the organic agent, and the decomposition of the organic iodine is mainly controlled by the anion ($Y^-$) of the organic agent. The retention of the organic iodine decomposition product is mainly controlled by the cation ($X^+$) of the organic agent.

In the decomposition of the organic iodine, as shown in the following formula 1, the organic agent ($X^+$-$Y^-$) can decompose radioactive organic iodine (RI) into a radioactive iodine ion ($I^-$). The iodine ion is more stable than the organic iodine in a liquid phase, and the cation of the organic agent has an effect of stably retaining the iodine ion, so that it is possible to retain the radioactive organic iodine in the liquid phase and surely prevent leakage to the environment.

$$X^+\text{-}Y^- + RI \rightarrow X^+\text{-}I^- + R^+\text{—}Y^- \quad \text{(Formula 1)}$$

According to these organic agents, it is possible to obtain non-volatility, substantially no volatilization at 160° C. or lower, heat resistance which can endure a high temperature of around 160° C., high radiation resistance, and high chemical stability.

Further, the compatibility between the organic agents and a specific gravity between the organic agents can be easily controlled based on a wide variety of combinations of ions.

Next, a structure of the cation constituting the organic agent will be described. In the structure of the cation, carbon or oxygen may be bonded to, via a single bond, mainly a phosphorus element, a sulfur element or a nitrogen element. That is, in the structure of the cation, carbon or oxygen may be bonded to, via a single bond, the phosphorus element, the sulfur element or the nitrogen element.

In order to maintain high solubility of the organic iodine, a carbon chain of the cation is preferably composed mainly of a single bond, and a part of the carbon chain of the cation may be composed of a double bond or a triple bond. Further, the carbon chain may be crosslinked with an oxygen element.

Further, as the structure of the anion, a structure exhibiting high nucleophilicity is preferable.

A part or all of a hydrogen element bonded to the carbon chain constituting the cation may be substituted with a fluorine element.

Examples of the cation constituting the organic agent include organic cations such as phosphonium, sulfonium, ammonium, pyrrolidinium, piperidinium, and morpholinium.

Examples of the ammonium as an organic cation include a quaternary ammonium salt represented by a general formula $NR_4^+$. In the formula, R is an alkyl group or the like, and the number of the carbon chains is two or more. In the examples described later, the organic iodine is decomposed using trihexyl(tetradecyl)phosphonium, which is a quaternary phosphonium salt, and high removability is exhibited.

As the phosphonium as an organic cation, a quaternary phosphonium salt $PR_4^+$ can be used. In the formula, R is an alkyl group or the like, and the number of the carbon chains is two or more.

As the sulfonium as an organic cation, a tertiary sulfonium salt $SR_3^+$ can be used. In the formula, R is an alkyl group or the like, and the number of the carbon chains is two or more.

For example, methyl iodine, which is the organic iodine, is not dissolved in 1-butyl-3-methylimidazolium bis(trifluoromethylsulfonyl)amide and separated, but is dissolved in trihexyl(tetradecyl)phosphonium bis(trifluoromethylsulfonyl)amide having the same anion structure but different cation structure, and mixed uniformly.

Since a methyl group or the like, which is a substance having one carbon chain of the cation, decomposes and volatilizes at a high temperature of 160° C., the number of the carbon chain of the cation is preferably 2 or more.

For example, it is known that 1-butyl-3-methylimidazolium, which has one carbon chain of the cation, undergoes autolysis by desorbing the methyl group of the cation at 160° C.

From this viewpoint, when the organic cation has a large number of carbon chains and is bulky, the solubility and the heat resistance of the organic iodine are increased, so that the organic iodine can be removed with high removal efficiency.

<Anion>

Next, the structure of the anion constituting the organic agent will be described. Examples of the structure of the anion include those having a charge in a carbon element, a sulfur element, a nitrogen element, an oxygen element, and a halogen element.

Examples of the organic anion having an anion charge in the carbon element include $H_3C^-$, $H_2RC^-$, $HR_2C^-$, $R_3C^-$, $NC^-$, and $RCC^-$.

Examples of the organic anion having an anion charge in the sulfur element include $RS^-$.

Examples of the organic anion having an anion charge in the nitrogen element include $N_3^-$, $H_2N^-$, $HRN^-$, and $R_2N^-$.

Examples of the organic anion having an anion charge in the oxygen element include $RO^-$, $RCO_2^-$, $RPO_3^-$, $RSO_3^-$, $RPO_4^-$, $R_2PO_2^-$, and $R_3CO^-$, and examples of an inorganic anion include $HO^-$, $NO_2^-$, $NO_3^-$, $FO_3^-$, $ClO_3^-$, $BrO_3^-$, $IO_3^-$, $FO_4^-$, $ClO_4^-$, $BrO_4^-$, and $IO_4^-$.

Examples of the inorganic have an anion charge in the halogen element include $F^-$, $Cl^-$, $Br^-$, $I^-$, $F_3^-$, $Cl_3^-$, $Br_3^-$, and $I_3^-$.

R in the formulas is a carbon chain, and is not particularly limited as long as R is a carbon chain. In addition, a part of the carbon chain may contain an oxygen bond, and a part or all of a hydrogen element bonded to the carbon chain may be substituted with a fluorine element.

As the anion constituting the organic agent, in terms of the effect of decomposing the organic iodine is strong, an ion having high nucleophilicity is preferable, and an anion having a charge in an element at a terminal is particularly preferable. However, the hydrogen element present at the terminal bonded to the carbon chain or the like is not included in the preferable element having a charge at the terminal.

For example, as compared with $H_2N^-$, anion molecules composed mainly of a nitrogen element having a charge other than the hydrogen element, such as $R_2N^-(R\text{—}N\text{—}R)$, have lower nucleophilicity, and a decomposition performance for methyl iodine is reduced.

In order to remove the organic iodine with high performance, it is necessary not only to dissolve the organic iodine by the cation of the organic agent, but also to decompose the generated organic iodine by a nucleophilic attack of the anion on the organic iodine.

Therefore, in terms that the structure of the anion has high nucleophilicity, is difficult to cause hydrolysis, and is difficult to change the pH of the scrubbing water 2 when the organic agent is injected into the filtered containment venting vessel 1, $H_3C^-$, $H_2RC^-$, $HR_2C^-$, $R_3C^-$, $NC^-$, $RCC^-$, $RS^-$, $N_3^-$, $H_2N^-$, $HRN^-$, $R_2N^-$, $RO^-$, $RCO_2^-$, $RPO_3^-$, $RSO_3^-$, $RPO_4^-$, $R_2PO_2^-$, $R_3CO^-$, $HO^-$, $NO_2^-$, $NO_3^-$, $FO_3^-$, $ClO_3^-$, $BrO_3^-$, $IO_3^-$, $FO_4^-$, $ClO_4^-$, $BrO_4^-$, $IO_4^-$, $F^-$, $Cl^-$, $Br^-$, $I^-$, $F_3^-$, $Cl_3^-$, $Br_3^-$, and $I_3^-$ are preferable.

EXAMPLE

Hereinafter, an example of iodine decomposition as in the present embodiment will be described.

FIG. 2 shows the removal efficiency for methyl iodine by the organic iodine remover 3 and a specific example of a chemical structure of the organic agent.

For organic agents having a unified cation structure of trihexyl(tetradecyl)phosphonium and anionic structures having different nucleophilicities, the removal performance for methyl oxide, which is the organic iodine, is shown.

An organic agent A is trihexyl(tetradecyl)phosphonium bis(trifluoromethylsulfonyl)amide.

An organic agent B is trihexyl(tetradecyl)phosphonium dicyanamide.

An organic agent C is trihexyl(tetradecyl)phosphonium decanoate.

An organic agent D is trihexyl(tetradecyl)phosphonium iodide.

An organic agent E is trihexyl(tetradecyl)phosphonium bromide.

An organic agent F is trihexyl(tetradecyl)phosphonium chloride.

Test conditions are close to actual conditions of the filtered containment venting, a methyl iodine concentration is 50 ppm, a temperature is 160° C., and a residence time is 0.5 sec.

When the anion structure of A in FIG. 2 is a bis(trifluoromethylsulfonyl)amide ion, the removal efficiency for methyl iodine is 1% or less. When the anion structure of B is a dicyanamide ion in FIG. 2, the removal efficiency for methyl iodine is 50%. When the anion structures of C to F are an acetate ion or a halide ion in FIG. 2, the removal efficiency for methyl iodine is 99% or more.

The decomposition of methyl iodine is controlled by the nucleophilicity of the anion, specifically by basicity of the element having an anion charge and a three-dimensional structure around the element having an anion charge. The reason why A and B in FIG. 2 have lower nucleophilicity than that of C to F is that bulky substituents are bonded to A and B at both ends of the nitrogen element having a charge, a steric hindrance is large, and a reaction with methyl iodine is inhibited.

Therefore, the anion to which the bulky substituents are bonded has low nucleophilicity and is not suitable for the decomposition of methyl iodine. As the anion to which the bulky substituents are bonded, for example, $PF_6^-$, $BF_4^-$, $FeCl_4^-$, $AlCl_4^-$, $Al_2Cl_7^-$ or the like has substituents (fluorine element, chlorine element) bonded to the element having a charge (phosphorus element, boron element, iron element, aluminum element), and the steric hindrance is large, so that the removal performance for methyl iodine cannot be expected.

Although there are high and low nucleophilic performances for methyl iodine, the decomposition of methyl iodine occurs in all the organic agents A to F in FIG. 2.

For example, each of the organic agents A to F is mixed and stirred with methyl iodine at 100° C., and the mixed solution is diluted with hydrated ethanol to produce methanol as shown in the following formula 2.

$$CH_3I+H_2O \rightarrow CH_3OH+I^-+H^+ \quad \text{(Formula 2)}$$

Therefore, the decomposition of methyl iodine by the organic agent occurs as in the following formula (3).

$$CH_3I \rightarrow CH_3^+ + I^- \quad \text{(Formula 3)}$$

In A to D of FIG. 2, since the organic agent stably retains the iodine ion ($I^-$) by an interaction with the cation, the iodine ion rarely volatilizes as hydrogen iodide (HI).

Further, when the organic iodine remover 3 is operated in the filtered containment venting apparatus 30, the scrubbing water 2 in the filtered containment venting vessel 1 is alkaline water, so that the iodine ion ($I^-$) is stably retained.

In 1-butyl-3-methylimidazolium, which is an organic agent including a cation and an anion having high nucleophilicity in which methyl iodine is not sufficiently dissolved, there is almost no removal performance for methyl iodine.

Therefore, even when the anion has high nucleophilicity, the removal performance for methyl iodine cannot be expected if the cation does not dissolve methyl iodine.

Of course, in 1-butyl-3-methylimidazolium bis(trifluoromethylsulfonyl)amide, which is an organic agent including a cation and an anion having low nucleophilicity in which methyl iodine is not sufficiently dissolved, there is no removal performance for methyl iodine.

Further, the organic agent needs to be composed of only a cation and an anion, and even when the solubility to methyl iodine is high, methyl iodine cannot be removed if the organic agent is a neutral molecule.

Examples of the neutral molecule having high solubility to methyl iodine include trioctylamine ($N(C_8H_{17})_3$), but such a neutral molecule does not have the removal performance for methyl iodine.

FIG. 3 shows a change over time of a decontamination factor of the organic agent.

The decontamination factor (DF) on a vertical axis is given by the following formula 4.

$C_0$ is the methyl iodine concentration at an entrance of the organic agent, and $C_{ex}$ is the methyl iodine concentration at an exit of the organic agent.

The DF shows a higher value as the removal performance for methyl iodine is higher.

$$DF = C_0/C_{ex} \quad \text{(Formula 4)}$$

The test conditions are the same as FIG. 2, the methyl iodine concentration is 50 ppm, the temperature is 160° C., and the residence time is 0.5 sec.

FIG. 3 shows a result when methyl iodine is removed using trihexyl(tetradecyl)phosphonium chloride, which is the organic agent F in FIG. 2.

The DF is stably 100 or more over an elapsed time of 240 minutes from an initial stage of the test, and the performance is 99% or more when converted to the removal efficiency.

Even in the same test using the anion structures of C to E in FIG. 2, the removal performance for methyl iodine equal to or higher than that of F in FIG. 2 is confirmed.

When an adsorbed amount of the organic agent is converted from an amount of methyl iodine removed up to the elapsed time of 240 minutes, 8.7 mg-I/g-organic agent is obtained.

Depending on the individual plant output or the accident scenario, among the radioactive substances generated during the accident, it is evaluated that about 1 kg of methyl iodine is generated and the amount of the organic agent required to remove the 1 kg of methyl iodine is 120 kg during the severe accident involving fuel damage such as damage of the nuclear reactor pressure vessel.

The organic agent includes at least one of an ionic liquid, an interfacial active agent, a quaternary salt, and a phase transfer catalyst. Of the organic agents, the ionic liquid is put to practical use for general industry. A characteristic of the ionic liquid is non-volatile, and the ionic liquid has sufficient heat resistance even under a condition of about 200° C., which is a gas temperature that is expected to flow into the filtered containment venting apparatus 30 during the accident. In addition, the ionic liquid also has excellent radiation resistance and has a property of dissolving (removing) substrates such as the radioactive substance in the ionic liquid at a high concentration. In particular, since the organic iodine is a highly volatile substance that is poorly soluble in water, the removal efficiency can be further improved by using the ionic liquid as a powerful organic agent for removing the organic iodine.

In the present embodiment, the organic agent used as the organic iodine remover 3 has been described by taking the ionic liquid as an example, and the present embodiment is not limited to this, and for example, the interfacial active agent, the quaternary salt, and the phase transfer catalyst can also be preferably applied, and the same effect as that of the ionic liquid can be obtained.

In addition, since the organic agent is a liquid which is a liquid phase even at 200° C. or higher, even during the accident, the organic agent can be stably present in a liquid phase, and the organic iodine can be sufficiently removed.

The type of the nuclear reactor is not particularly limited in each of the above removal apparatuses and removal methods. Various types of the nuclear reactor such as a boiling water reactor (BWR), an advanced boiling water reactor (ABWR), and a pressurized water reactor (PWR) can be applied. The ionic liquid or the like that can be used as the organic agent is put to practical use for general industry. The ionic liquid or the like contaminated with radioactive substances can be treated and regenerated by, for example, a method described in JP-T-2003-507185.

REFERENCE SIGN LIST 1 filtered containment venting vessel
2 scrubbing water
3 organic iodine remover
4 containment vessel
4A nuclear reactor pressure vessel
5, 6 isolation valve
7 dry well venting pipe
8 wet well venting pipe
9 inlet pipe
10 metal filter
11 outlet pipe
12 exhaust pipe
18 storage container
19 injection pipe
20 valve
30 filtered containment venting apparatus
31 dry well
32 wet well

The invention claimed is:
1. An organic iodine remover that removes organic iodine in a containment vessel of a nuclear reactor,
wherein the organic iodine remover is a substance composed of a cation and an anion and liquid at a temperature between 100° C. and 200° C.,
the cation is a substance which dissolves methyl iodine,
the organic iodine remover is a substance in which
in a structure of the cation, carbon or oxygen is bonded, via a single bond, to a phosphorus element, a sulfur element or a nitrogen element, and
a structure of the anion has an anion charge present in a carbon element, a sulfur element, a nitrogen element, an oxygen element or a halogen element, and
the organic iodine remove is a substance in which the anion is composed of $H_3C^-$, $H_2RC^-$, $HR_2C^-$, $R_3C^-$, $NC^-$, and $RCC^-$, which has a charge present in the carbon element.

2. An organic iodine remover, that removes organic iodine in a containment vessel of a nuclear reactor, wherein
the organic iodine remover is a substance composed of a cation and an anion and liquid at a temperature between 100° C. and 200° C.,
the cation is a substance which dissolves methyl iodine,
the organic iodine remover is a substance in which
in a structure of the cation, carbon or oxygen is bonded, via a single bond, to a phosphorus element, a sulfur element or a nitrogen element, and
a structure of the anion has an anion charge present in a carbon element, a sulfur element, a nitrogen element, an oxygen element or a halogen element, and
the organic iodine remover is a substance in which the anion is composed of $RS^-$, which has a charge present in the sulfur element.

3. An organic iodine remover that removes organic iodine in a containment vessel of a nuclear reactor, wherein
the organic iodine remover is a substance composed of a cation and an anion and liquid at a temperature between 100° C. and 200° C.,
the cation is a substance which dissolves methyl iodine,
the organic iodine remover is a substance in which
in a structure of the cation, carbon or oxygen is bonded, via a single bond, to a phosphorus element, a sulfur element or a nitrogen element, and
a structure of the anion has an anion charge present in a carbon element, a sulfur element, a nitrogen element, an oxygen element or a halogen element, and
the organic iodine remover is a substance in which the anion is composed of $N_3^-$, $H_2N^-$, $HRN^-$, and $R_2N^-$, which has a charge present in the nitrogen element.

4. An organic iodine remover that removes organic iodine in a containment vessel of a nuclear reactor, wherein
the organic iodine remover is a substance composed of a cation and an anion and liquid at a temperature between 100° C. and 200° C.,
the cation is a substance which dissolves methyl iodine,
the organic iodine remover is a substance in which
in a structure of the cation, carbon or oxygen is bonded, via a single bond, to a phosphorus element, a sulfur element or a nitrogen element, and
a structure of the anion has an anion charge present in a carbon element, a sulfur element, a nitrogen element, an oxygen element or a halogen element, and the organic iodine remover is a substance in which the anion is composed of $HO^-$, $NO_2^-$, $NO_3^-$, $RO^-$, $RCO_2^-$, $RPO_3^-$, $RSO_3^-$, $RPO_4^-$, $R_2PO_2^-$, $R_3CO^-$, $FO_3^-$, $ClO_3^-$, $BrO_3^-$, $IO_3^-$, $FO_4^-$, $ClO_4^-$, $BrO_4^-$, and $IO_4^-$, which has a charge present in the oxygen element.

5. The organic iodine remover according to claim 1, which is a substance in which the anion is composed of $F^-$, $Cl^-$, $Br^-$, $I^-$, $F_3^-$, $Cl_3^-$, $Br_3^-$, and $I_3^-$, which has a charge present in the halogen element.

6. The organic iodine remover according to claim 1, which is a substance in which a part of a carbon chain R of the anion is composed of an oxygen bond.

7. The organic iodine remover according to claim 1, which is a substance in which a part or all of a hydrogen element bonded to a carbon chain of the anion is substituted with a fluorine element.

8. The organic iodine remover according to claim 2, which is a substance in which a part of the carbon chain R of the anion is composed of an oxygen bond.

9. The organic iodine remover according to claim 2, which is a substance in which a part or all of a hydrogen element bonded to the carbon chain of the anion is substituted with a fluorine element.

10. The organic iodine remover according to claim 3, which is a substance in which a part of the carbon chain R of the anion is composed of an oxygen bond.

11. The organic iodine remover according to claim 3, which is a substance in which a part or all of a hydrogen element bonded to the carbon chain of the anion is substituted with a fluorine element.

12. The organic iodine remover according to claim 4, which is a substance in which a part of the carbon chain R of the anion is composed of an oxygen bond.

13. The organic iodine remover according to claim 4, which is a substance in which a part or all of a hydrogen element bonded to the carbon chain of the anion is substituted with a fluorine element.

14. A filtered containment venting apparatus for removing a radioactive substance comprising:
   a filtered containment venting vessel including scrubbing water and a filter for removing a radioactive substance therein;
   a venting pipe connected to a nuclear reactor pressure vessel;
   an inlet pipe including an end connected to the venting pipe and another end introduced in the filtered containment venting vessel;
   an outlet pipe connected to the filter in the filtered containment venting vessel;
   an organic iodine remover disposed in the filtered containment venting apparatus,
   wherein the organic iodine remover is an organic iodine remover according to claim 1.

15. The filtered containment venting apparatus according to claim 14, further comprising:
   a storage container storing the organic iodine remover,
   wherein the storage container is disposed outside the filtered containment venting vessel.

16. A filtered containment venting apparatus for removing a radioactive substance comprising:
   a filtered containment venting vessel including scrubbing water and a filter for removing a radioactive substance therein;
   a venting pipe connected to a nuclear reactor pressure vessel;
   an inlet pipe including an end connected to the venting pipe and another end introduced in the filtered containment venting vessel;
   an outlet pipe connected to the filter in the filtered containment venting vessel;
   an organic iodine remover disposed in the filtered containment venting apparatus,
   wherein the organic iodine remover is an organic iodine remover according to claim 2.

17. A filtered containment venting apparatus for removing a radioactive substance comprising:
   a filtered containment venting vessel including scrubbing water and a filter for removing a radioactive substance therein;
   a venting pipe connected to a nuclear reactor pressure vessel;
   an inlet pipe including an end connected to the venting pipe and another end introduced in the filtered containment venting vessel;
   an outlet pipe connected to the filter in the filtered containment venting vessel;
   an organic iodine remover disposed in the filtered containment venting apparatus,
   wherein the organic iodine remover is an organic iodine remover according to claim 3.

18. A filtered containment venting apparatus for removing a radioactive substance comprising:
   a filtered containment venting vessel including scrubbing water and a filter for removing a radioactive substance therein;
   a venting pipe connected to a nuclear reactor pressure vessel;
   an inlet pipe including an end connected to the venting pipe and another end introduced in the filtered containment venting vessel;
   an outlet pipe connected to the filter in the filtered containment venting vessel;
   an organic iodine remover disposed in the filtered containment venting apparatus,
   wherein the organic iodine remover is an organic iodine remover according to claim 4.

* * * * *